United States Patent [19]

Makino et al.

[11] Patent Number: 4,735,494
[45] Date of Patent: Apr. 5, 1988

[54] ZOOM LENS CONTROL SYSTEM AND METHOD FOR ZOOMING CONTROL

[75] Inventors: Hiroshi Makino, Hirakata; Tadaharu Kihara, Habikino; Akira Takashima, Osaka, all of Japan

[73] Assignee: West Electric Company, Ltd., Osaka, Japan

[21] Appl. No.: 864,277

[22] Filed: May 19, 1986

[30] Foreign Application Priority Data

May 20, 1985 [JP] Japan ................... 60-107558

[51] Int. Cl.$^4$ .................. G02B 7/10; G02B 15/14; H04N 5/232
[52] U.S. Cl. .................. 350/429; 350/320; 358/227
[58] Field of Search .............. 350/429, 430, 320; 358/225, 227

[56] References Cited

U.S. PATENT DOCUMENTS

| | | | |
|---|---|---|---|
| 4,054,372 | 10/1977 | Schröeder | 350/429 |
| 4,161,756 | 7/1979 | Thomas | 350/429 |
| 4,531,157 | 7/1985 | Ishikawa | 358/227 |

*Primary Examiner*—John K. Corbin
*Assistant Examiner*—Loha Ben
*Attorney, Agent, or Firm*—Cushman, Darby & Cushman

[57] ABSTRACT

The present invention user plural driving speeds of the focusing lens component of a zoom lens which responds to plural separate control regions of focal length and object position. In each control region, the focusing lens component is driven in predetermined suitable constant speed. By this operation the object is nearly focused on the focal plane. The slight discrepancy between the image position of the object and the ideal plane is regarded as zero.

13 Claims, 6 Drawing Sheets

FIG. 3

| | | Position of zooming lens component | | | |
|---|---|---|---|---|---|
| | | ····X | X····Y | Y····Z | Z···· |
| Object position | 1.0 m ⋮ 2.0 m | S1 A | S2 C | S3 F | S4 I |
| | 2.0 m ⋮ 3.0 m | S5 B | S6 D | S7 G | S10 K |
| | 3.0 m ⋮ 5.0 m | S8 E | S9 H | S11 J | S12 M |
| | 5.0 m ⋮ ∞ | S13 L | S14 N | S15 O | S16 P |

ZOOM LENS CONTROL SYSTEM AND METHOD FOR ZOOMING CONTROL

FIELD OF THE INVENTION AND RELATED ART STATEMENT

1. Field of the Invention

The present invention relates to a zooming control system, zooming apparatus and a method for zooming control. The invention specifically relates to a zooming control system and method for a rear focusing type zoom lens for use in a video camera and in other photographic systems.

2. Description of the Related Art

A rear focusing type zoom lens is proposed use in a video camera and in other photographic systems because it has several merits compared with conventional front focusing type zoom lenses. For example, the focusing lens component of rear focusing type zoom lens is disposed at the rear of the lens assembly nearest in position to its focal plane. Therefore, an optical beam from an object is stopped down from that position. However, the focusing lens component of a front focusing type zoom lens is disposed on the most front part, nearest in position to the object. Because the diameter of the focusing lens component is determined by maximum focal length and maximum F-number of the zoom lens the size, weight and adjusting quantity of the focusing lens component of the rear focusing type zoom lens are respectively smaller, higher and shorter than those of the front focusing type zoom lens.

Though the rear focusing type zoom lens has the above-mentioned merits, the adjusting quantity for focusing of the focusing lens component becomes a function of two kinds of variables: the focal length of the zoom lens and the distance to the object. This is so in rear focusing type zoom lenses because the focal point of the object is moved by zooming action.

In order to improve the above-mentioned demerits of the rear focusing type zoom lens, mechanical compensation methods or electrical compensation methods have been proposed. For example, in the mechanical compensation method, the focusing lens component is moved along very complex non-linear cams which respond to the zooming action. In the electrical compensation method, it has been proposed that the focusing lens element be positioned based upon computed position which is determined from the set focal length, which is computed by a focal length signal of the zooming lens component, and of the distance to the object, which is computed by a distance signal. This proposal is outlined in the non-examined Japanese patent publication No. Sho 52-66445 or No. Sho 53-116828.

The mechanical compensation method has, however, the disadvantage of having cams with complex configurations and large shape. The electrical compensation method has disadvantage of high cost and slow response caused by the high precision and large data processing necessary for accuracy.

Furthermore, when the focal length is set at a long focal length or the object is near the lens, the required adjustment of the focusing lens component necessary for compensation of the discrepancy, which results from the change in focusing state due to the zooming action, is large. This large adjustment takes a considerable amount of time because of the slow response (e.g. due to the delay of computing time) of the electrical compensation method. Problem may occur because the focusing lens component cannot follow the zooming action. Another problem occurs, when the focal length is set in the region of short focal length or the object is far from the lens and the focusing lens component is not adjusted very much. In this case, a trouble of over adjusting may occur.

OBJECT AND SUMMARY OF THE INVENTION

The object of the present invention is to provide an improved zoom lens control system and an improved method for zooming control of a rear focusing type zoom lens which remains focused on the image of the object during the zooming action.

A zoom lens control system in accordance with the present invention is made up of the following components.

A zooming action detecting means detects whether the zooming lens component of the zoom lens is needed or not.

A zooming lens position detecting means detects the current position of the zooming lens component.

An object position measuring means measures distance from the focal plane of the zoom lens in said object.

A control region memory means stores data of plural control regions alloted to plural divided focal length regions from longest focal length to shortest focal length of the zoom lens, and plural divided object position regions from closest focusing position of the zoom lens to infinity.

A control region selecting means selects the most suitable one control region among the plural control regions based on current focal length and current object position.

A driving speed data memory means stores plural driving speed data corresponding to the plural control regions, for driving focusing lens component of the zoom lens.

A driving means drives the focusing lens component for adjusting position of the focusing lens component to maintain the focused state of the object on the focal plane of the zoom lens.

A driving speed data reading means reads one set of driving speed data corresponding to the selected control region and supplies the driving signal to the moving means for driving the focusing lens component in most suitable speed based on the current focal length and the current object position.

Another embodiment of the zoom lens control system in accordance with the present invention is made up of the following components.

A zooming action detecting means detects whether the zooming lens component of the zoom lens is needed or not.

A contrast signal detecting means detects contrast signals of objects passing throuth the zoom lens.

A zooming lens position detecting means detects the current position of the zooming lens component.

A focusing lens position detecting means detects the current position of the focusing lens component.

An object position measuring means measures the distance from the focal plane to the object.

A zooming direction detecting means detects whether the zooming action is from the shorter side to longer side of focal length or the contrary.

A control region memory means for stores data of plural control regions allotted to plural divided focal length regions from longest focal length to shortest focal length of the zoom lens, and plural divided object position regions from closest focusing positions of the zoom lens to infinity.

A control region selecting means selects the most suitable control region among the plural control regions based on current focal length and current object position, and sets the automatic focusing means in ready state.

A driving speed data memory means stores plural driving speed data, corresponding to each of the plural control regions, for driving focusing lens component of the zoom lens.

A driving means drives the focusing lens component for adjusting the position of the focusing lens component to maintain a focused state of the object on the focal plane of the zoom lens with considering zooming direction and driving speed, and driving speed data reading means for reading one set of driving speed data corresponding to the selected control region and supplying a driving signal to the driving means for driving the focusing lens component at the most suitable speed based upon the current focal length and the current object position.

BRIEF DESCRIPTION OF THE DRAWINGS

FIG. 3 is a chart showing a table of contents of memory in driving speed data memory 5 in FIG. 1.

DESCRIPTION OF THE PREFERRED EMBODIMENTS

Figure 1:
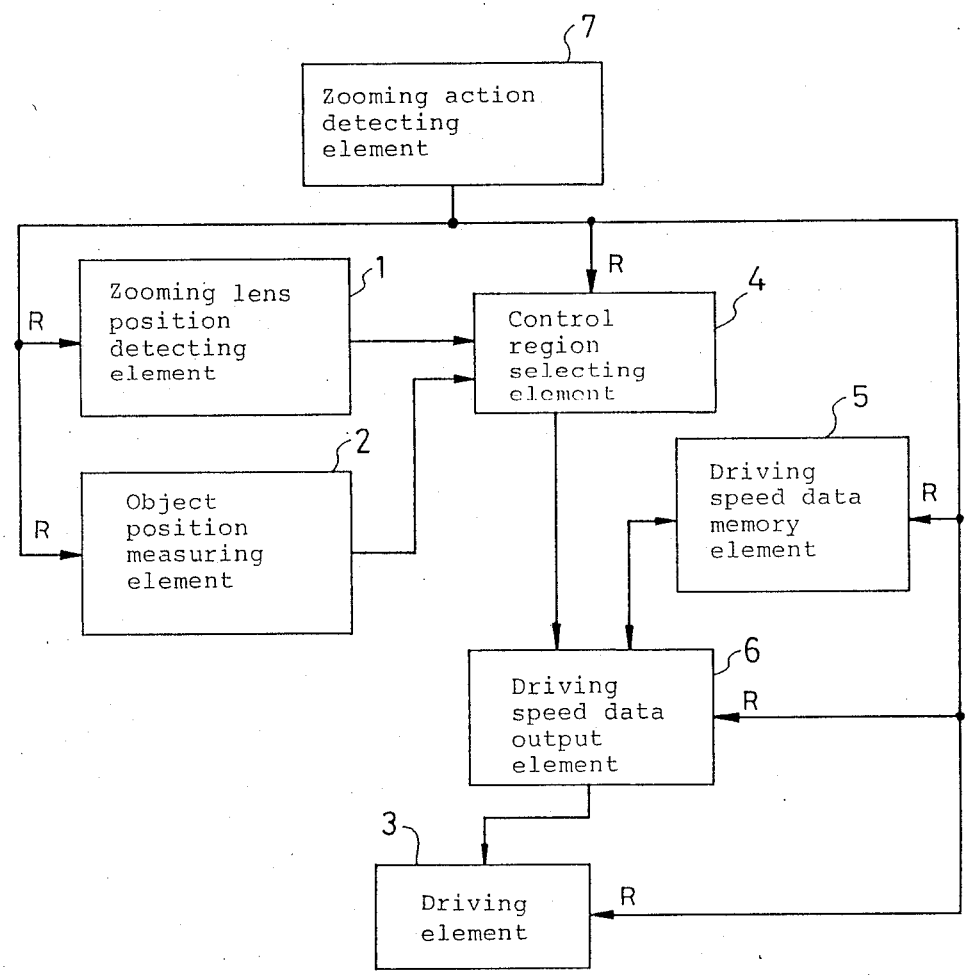
FIG. 1 is a block diagram showing an embodiment of a zooming control system of a rear focusing type zoom lens in accordance with the present invention.
Figure 2:
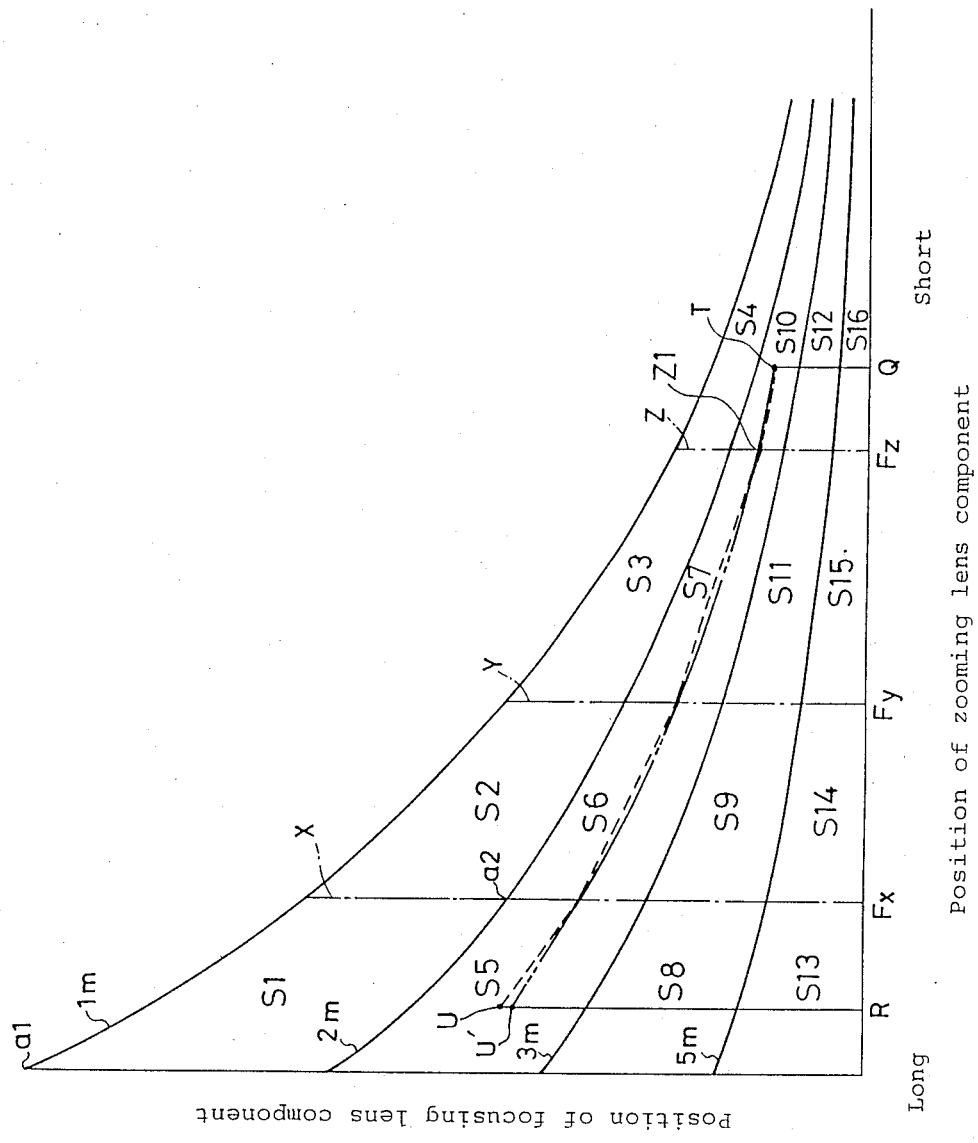
FIG. 2 is a characteristic diagram showing focusing characteristics of the rear focusing type zoom lens during zooming action in accordance with the present invention.

An embodiment of a zooming control system of a rear focusing type zoom lens in accordance with the present invention is described referring to FIG. 1, FIG. 2 and FIG. 3. FIG. 1 shows a block diagram of the zooming control system of the rear focusing type zoom lens. Such zooming control system comprises: a zooming lens position detecting element 1 for detecting the current position of zooming lens component which is driven by an electric motor (not shown in the drawing); an object position measuring element 2 for measuring the object position and outputting a signal of data of distance to the object, a driving element 3 for controlling the movement of the focusing lens component taking account of moving direction of a zooming lens component, which contains a driving power source such as the electric motor (not shown in the drawing); a control region selecting element 4 for selecting a control region in which the current positive of the zooming lens component and the current object position are contained; a driving speed data memory element 5 which memorises plural driving speed data; a driving speed data output element 6 for taking a driving speed datum from the driving speed data memory element 5 and outputting the driving speed data to the driving element 3; and a zooming action detecting element 7 for detecting a start point or continuation of the zooming action and setting the above-mentioned each elements an active state.

Hereupon the control region selecting element 4 and plural driving speed data which are stored in the driving speed data memory element 5 are described in detail referring to FIG. 2 and FIG. 3. FIG. 2 shows characteristic curves of the rear focusing type zoom lens showing relations of positions of zooming lens component and positions of focusing lens component by which the focused state can be obtained at several arbitrary object positions such as 1 m, 2 m, 3 m, and 5 m. Such characteristic curves make it clear that the focusing lens component must be adjusted responding to the movement of the zooming lens component so as to obtain the focused state of the image, and the longer the focal length of the zoom lens becomes or the nearer the object positions become, the larger the adjusting quantity of the focusing lens component becomes.

The control region selecting element 4 receives output signals from the zooming lens position detecting element 1 and the object position detecting element 2, and compares a current state set by the output signals and plural control regions which are memorised in the control region selecting element 4. The control regions shown in FIG. 2 are divided taking account of focal length of the zoom lens and object position. Such divided regions are divided in a manner to be gradually narrow as the focal length is long and object position is far. Hereupon, by considering the regions from S1 to S16 divided by the single-dotted chain lines x, y, z and the characteristic curves corresponding to the distances to the objects of at 1 m, 2 m, 3 m and 5 m, the regions S10, S11, S12, S13, S14, S15 and S16, which are showing conditions of short focal lengths and/or far objects, do not need large adjusting quantity of the focusing lens component at the movement of the zooming lens component. On the other hand, for the regions S1, S2, S3, S4, S5, S6, S7, S8 and S9, which are showing conditions of long focal lengths and/or near objects, need large adjusting quantities of the focusing lens component. These difference causes a trouble that the focusing lens component cannot follow the movement of zooming lens component. Within each of such regions from S1 to S16, the characteristics of moving of the focusing lens component can be handled as linear, therefore, by setting the driving speed of the zooming lens component as constant and the moving speed of the focusing lens component as predetermined values responding to the above-mentioned moving speed, the focused state can be maintained during the zooming action. Accordingly, the complexed computation process for computing the position of focusing lens component against the zooming lens component taking account of the object position is not necessary at all, by using the plural regions from S1 to S16 as respectively as control regions. The regions from S1 to S16 can be controlled by separating into other ways of two part classifications, such as, a first group of regions from S1 to S9 and a second group of regions from S10 to S16.

FIG. 3 shows contents of the driving speed data memory 5. In FIG. 3, numerals from S1 to S16 are corresponding to addresses of memory and plural different driving speed data from A to P are set with considering the moving speed of the focusing lens component and zooming lens component, and such data become gradually slow from A to P and respectively respond to regions from S1 to S16 in FIG. 2.

Next, a zooming control system in accordance with the present invention is described. A start point and end point of the zooming action are respectively set as points Q and R, and the position of the focusing lens component is at point T which is the focal point against the object of 2.5 m far from the focal plane, for explanation convenience. Furthermore, the zooming lens component are driven at constant speed by electric motor.

When the zooming action starts, each element shown in FIG. 1 is set in active state by the action of zooming action detecting element 7, by action of the zooming lens position detecting element 1 and the object position detecting element 2, condition of point T which is in start condition of zooming action is detected. And output signals of the zooming lens position detecting element 1 and the object position detecting element 2 are supplied to the control region selecting element 4. By receiving the output signals, the control region selecting element 4 detects that the start condition is at point T in FIG. 2. This shows that the focal length of the zoom lens at the start of zooming action is set as Q (Q is an arbitrary value and is in this case, the shortest focal lenth of the zoom lens) and the object is at a position of 2.5 m far from the focal plane, and accordingly the control region selecting element 4, selects the region S10 which contains the above-mentioned condition. Then, the output signal responding to the above-mentioned region data is supplied to the driving speed data output element 6. After receiving the output signal, responding to the above-mentioned region S10, the driving speed data output element 6 reads a moving driving speed data of the focusing lens component, responding to the region S10, namely the moving driving speed data K in FIG. 3 from the driving speed data memory element 5, and supplies such data to the driving element 3. The driving element 3 drives the focusing lens component in speed K, based on the moving direction of the zooming lens component.

When the movements of the focusing lens component and the zooming lens component are advanced and the focal length of the zoom lens reaches the point Z1, in FIG. 2 which is the longer focal length than the focal length Q. Then, the control region selecting element 4 selects another region S7 as the present state, by receiving output signals of the zooming lens position detecting element 1 and the object position detecting element 2, and outputs a signal responding to the region S7. Accordingly, the driving speed data output element 6 supplies a moving driving speed data G responding to the region S7, by changing the moving driving speed data K to the driving element 3. As a result of such operation, the focusing lens component is driven as a little faster moving speed G than the moving speed K. By, further advancing the zooming action, the control region selecting element 4 in turn selects regions S6 and S5, the focusing lens component is driven by moving speed D and B in FIG. 3, and the moving characteristic is changed as shown by dotted line in FIG. 2. When the zooming action is finished at a focal length R in the region S5, operations of all parts in FIG. 1 are stopped by the action of the zooming action detecting element 7. And as a result, the focusing lens element is stopped at a point U in FIG. 2. Hereupon, by comparing the actually stopped position U of of the focusing lens component and ideal position of the focusing lens component U' on double-dotted chain line corresponding to the focusing characteristic curve, for the case where the object is at position of 2.5 m, the positions U and U' are almost on the same point, and discrepancy may be negligible as in the focal depth. Accordingly, by using the above-mentioned zooming control system, the zoom lens can operate the zooming action substantially in focused state.

In the above-mentioned description, the driving speed of the zooming lens component is regarded as constant. But, in case the plural moving speeds of the zooming lens component are set, settings of corresponding numbers of driving speed data of the focusing lens component for all regions shown in FIG. 2 can easily be made. Furthermore, in case that the zooming action is operated in opposite direction, the focusing lens component is also driven in opposite direction.

Figure 4:
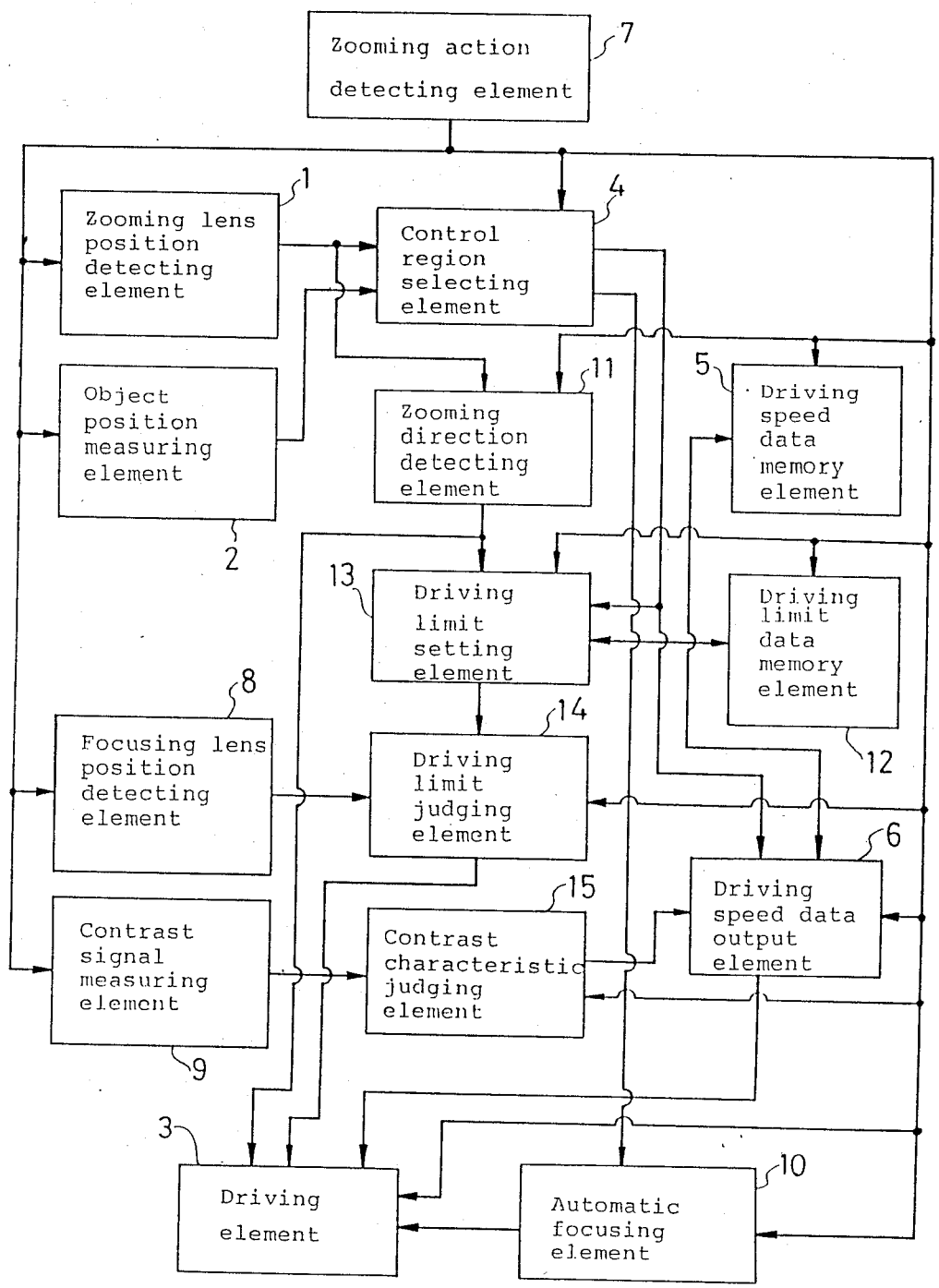
FIG. 4 is a block diagram showing another embodiment of a zooming control system of a rear focusing type zoom lens in accordance with the present invention.

FIG. 4 shows a block diagram of another embodiment in accordance with the present invention. Elements and components designated by the same numerals as in FIG. 1 act the same function. In FIG. 4, a focusing lens position detecting element 8 detects the current position of the focusing lens component (which is not shown in FIG. 4), a contrast signal detecting element 9 detects the contrast signal of the object passing through the zoom lens, and an automatic focusing element 10 controls the electric motor for driving the focusing lens component by detecting the contrast signal of the object. When the contrast signal or the object position changes, the automatic focusing element 10 adjusts the position of the focusing lens component.

A zooming direction detecting element 11 detects direction of zooming action, from output signal of the zooming lens position detecting element 1. A driving limit data memory element 12 stores driving limit data of the longer focal length side and the shorter focal length side of each control region which is selected by the control region selecting element 4 for controlling the focusing lens component. A driving limit setting element 13 takes and sets the driving limit data from the driving limit data memory element 12 taking account of the output signal of the zooming direction detecting element 11. A driving limit judging element 14 supplies a stop signal to the driving element 3 when the current position of the focusing lens component is over the driving limit by comparing the current position detected by the focusing lens position detecting element 8 and the driving limit set by the driving limit setting element 13. With regard to the region S1 in FIG. 2, the driving limit data memory element 12 stores conditions of point "a1" as the closest position data and "a2" as the farthest position data. And also the farthest position data "a2" is equal to a closest position data of the region S6. A contrast characteristic judging element 15 supplies a faster moving driving speed data than the moving driving speed data memorised in the driving speed data memory element 5, when an increased value is larger than the set value after receiving the contrast signal from the contrast signal detecting element 9, by detecting the increased value of the contrast signal and comparing the increased value and predetermined set value. For the convenience of elucidation, as mentioned above, this embodiment shown in FIG. 4 is described as comprising all the compensating elements on the embodiment shown in FIG. 1, so as to practice the same purpose in more superior state. The control region selecting element 4 and the driving speed data memory element 5 in FIG. 4 are, however, a little different from that of in FIG. 1 though being designated by the same numbers. Namely, the control region selecting element 4 further has functions of separating and operating two parts of regions from S1 to S9 and regions from S10 to S16, and when the regions from S10 to S16 are selected, the control region selecting element 4 set the automatic focusing element 10 active. Stored data in the driving speed data memory element 5 is set so as to respond to the regions from S1 to S9.

The zooming control system shown in FIG. 4 of the rear focusing type zoom lens in accordance with the present invention is described in the following. And the conditions of zooming action are the same as afore-mentioned embodiment.

When the zooming action starts, the region S10 responding to the current state is selected by functions of the two detecting elements 1 and 2 and the control region selecting elements 4. By selecting the region S10, the above-mentioned embodiment sets the moving driving speed data K. On the other hand, the control region selecting element 4 in this embodiment sets the automatic focusing element 10 active by dividing functions of the control region selecting element 4 as mentioned above. During the zooming action, if the focusing lens component stops and remains there, the contrast signal is changed. Accordingly, the automatic focusing element 10 operates its function when the zooming action begins, and the focusing lens component is driven for adjusting the focal point by the operation of driving element 3 based on the direction of zooming action. When the movement of zooming lens component and focusing lens component proceed and the focal length reaches longer regions than the focal length Z shows in FIG. 2, the control region selecting element 4 selects the region S7 and outputs a responded signal. Such region S7 is a region in which the focusing lens component is difficult to follow the zooming action by using on conventional zooming control system. In case of selecting such region S7, the control region selecting element 4 makes the driving speed data output element 6 act and the driving speed data output element 5 supplies a moving driving speed data "G" in FIG. 3 responding to the region S7 to the driving element 3. And also, the signal responding to the region S7 is supplied to the driving limit setting element 13, and the driving limit setting element 13 also begins to act. The driving limit setting element 13 takes the limit position data responding to the region S7 from the driving limit data memory element 12 and sets the farthest or closest driving limit position of the focusing lens component in the region S7 in relation to output signal of the zooming direction detecting element 11. The driving limit set by the element 13 is compared with the current position signal of the focusing lens position detecting element 8 by the driving limit judging element 14. And when the current position is over the driving limit position, the driving limit judging element 14 supplies a stop signal instantly to the driving element 3. In case that the current position is not over the driving limit, the moving of focusing lens component is continued, an output signal of the contrast signal detecting element 9 is compared with a previously set characteristic which is set in the contrast characteristic judging element 15, and change of contrast signal with the movement of the focusing lens component is judged as normal or not. Such judgement is practiced for judging whether the increased value of the contrast signal is larger or smaller than the previous set value. And only when the judging is "smaller" than the set value, the zooming action is regarded as normal and the focusing lens component is continuously driven in the moving speed responding to the region S7. When the judging is "larger" than the set value, the focusing lens component need to be driven for focused state. Therefore, the contrast characteristic judging element 15 outputs a control signal for making the driving speed data output element 5 supply data for faster driving speed than the driving speed data responding to the region S7. Namely, when the contrast signal largely increases in spite of movement being made in a right speed corresponding to the selected region, the moving speed of the focusing lens component is increased from the speed corresponding to the region. Strictly speaking, the moving speed set for corresponding to each region is not suitable speed because each selected region has a width corresponding to respective focal lengths and object positions. For example, in boundary regions of each region, errors appear on image display of video monitor. Accordingly, the above-mentioned operation is made to compensate such errors. Then, there may be a trouble that the moving speed of the focusing lens component is unnecessarily increased by moving of the object or vibration of the camera. Though, selected regions are set the driving limit mentioned above, and operations below the control region selecting element 4 containing operation of the contrast characteristic judging element 15, is repeated by predetermined period, therefor; the focal point may not be discrepant even if the moving speed is unnecessarily increased.

When the zooming action further proceeds, the focusing lens component, passing through the region S6, reaches the region S5 and zooming action is completed on the line R, which shows the focal length. The above-mentioned operations of respective element are finished by the zooming action detecting elements 7. Namely, when the zooming action is over, the automatic focusing element 10 is operated only one time.

The automatic focusing element 10 is used as a focused state confirming element for adjusting position of the focusing lens component, in order to obtain a more precise focal point besides the almost focused state was already obtained by above-mentioned operations. This embodiment shown in FIG. 4 further comprises several elements on the embodiment shown in FIG. 1. Accordingly, both embodiments are expected to have the same effects. Furthermore, in case that the zooming action is operated in opposite direction, the focusing lens component is also driven in opposite direction.

In the embodiment of FIG. 4, the automatic focusing element 10 is used for compensating the position of the focusing lens component in selected regions from S10 to S16 when the moving of the focusing lens component and the zooming lens component are completed. The automatic focusing element 10 is, as is well-known, is made by automatic focusing apparatus for detecting the contrast signals of the object. The output signals of the contrast signal detecting element 9 of this embodiment can be used.

Figure 5:
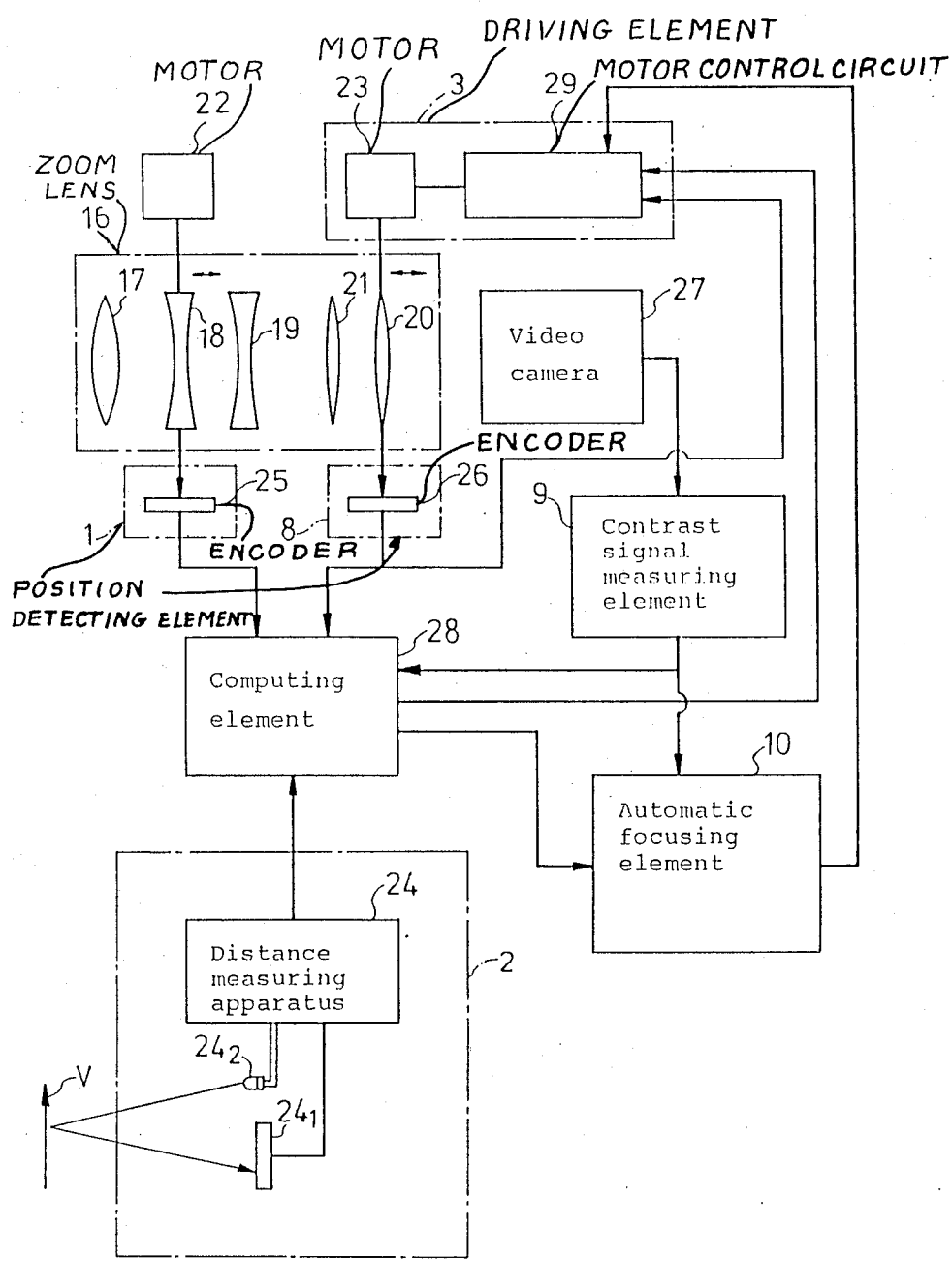
FIG. 5 is a block diagram showing an embodiment of zooming apparatus of a rear focusing type zoom lens for practicing the zooming control system shown in FIG. 4.

FIG. 5 shows an embodiment of a zooming apparatus in accordance with the present invention, and in this zooming apparatus, the zooming control system shown in FIG. 4 is practiced. In FIG. 5, elements designated by the same numerals of FIG. 1 and FIG. 4 are the same element and acts in the same function.

In FIG. 5, a rear focusing type zoom lens 16, comprises a front lens component 17 for limiting open aperture value (F number) and longest focal length, a zooming lens component 18 for changing the focal length of the zoom lens 16 by moving along optical axis, a compensating lens component 19 which is linked with the zooming lens component 18 by a cam for adjusting focal point of infinitive object during the changing of the focal length, a focusing lens component 20 for focusing the object by moving along the optical axis and a relay lens component 21. Motors 22 and 23 drive respectively the zooming lens component 18 and the focusing lens component 20. More concretely, a servo motor or a stepping motor or the like is used. The motor 23 constitutes the driving element 3 in FIG. 1 or FIG. 4 together with a motor control circuit 29 which will be described later in detail. A distance measuring apparatus 24 for measuring the distance to an object V, a photo-sensing device 241 and a light source 242 together constitute the object position detecting element 2 in FIG. 1 or FIG. 4. Encoders 25 and 26 respectively detect the position of the zooming lens component 18 and the focusing lens compoenet 20, and also constitute the above-mentioned position detecting elements 1 and 8. When using a stepping motor as motors 22 and 23, pulse counters and the like can be used as the position detecting elements 1 and 8 for counting driving pulse of the stepping motor instead of such encoders. An image sensor such as CCD, vidicon (tube type image sensor) or the like of a video camera 27 is provided on the focal plane of the zoom lens 16. A computing circuit 28 comprises the control region selecting element 4, the driving speed data memory element 5, the zooming direction detecting element 11 and the contrast characteristic judging element 15, which is constituted by, for example, a microcomputer control unit, or the like. The above-mentioned motor control circuit 29 controls the motor 23 responding to the output signal of the computing circuit 28. As shown in FIG. 5, for elements except the computing circuit 28, well-known technologies can be used. Accordingly, the following description on operation of the computing circuit 28 is made on a premise that the circuit is configurated mainly of microcomputer with reference to a flow-chart shown in FIG. 6.

When the zooming action is started by operation of a driving control element of the motor 22, which is not shown in FIG. 5, the microcomputer of the computing circuit 28 begins the operation and step 601 is set.

Step 601 is a step for activating the zooming action, and selects step 602 in case the zooming action is practiced, or alternatively step 617 in case the zooming action is not practiced.

Step 602 is a step for remembering that the zooming action is practiced, and in step 602, data "1", showing the practicing of zooming action, is stored in a predetermined memory FZ.

When step 602 is completed, step 603 is selected, and the current position of the zooming lens component 18, to which the above-mentioned regions of focal length X, Y, Z belong, is judged, by the position data from the zooming lens position detecting element 1, which corresponds to the encoder 25.

After that, in step 604, the position data of the object V is taken from the object position detecting element 2 which works as the distance measuring apparatus 24. In step 605, one control region is selected from the above-mentioned plural control regions from S1 to S16, by the focal length region judged in step 603 and by the object position data from the distance measuring apparatus 24. And further, judging is made whether the selected control region is contained in the regions (S1–S9) which can be controlled by the conventional control system or the regions (S10–S16), in which the automatic focusing element 10 adjusts the position of the focusing lens component.

In case when the judgment result of the step 605 is the latter region, namely that which the automatic focusing element 10 adjusts, step 620 is selected and sets a moving driving speed data corresponding to the selected region. When, the judgment result is the former region, step 606 is selected.

After setting a moving driving speed data in step 606, direction of the zooming action is judged in step 607, and in case the direction is toward the longer side, step 608 is selected. Where the direction is toward the shorter side, step 610 is selected, and the moving direction for moving the focusing lens component 20 is set.

Furthermore, as the operation of the computing circuit 28 proceeds, step 609 and step 611 are selected, and in these steps a driving limit corresponding to the selected control region of the focusing lens component 20 is selected and set in step 605, and after that, step 612 is selected. Hereupon, the selected driving limit in step 609 is close side limit data corresponding to the above-mentioned point 'a1", and on the contrary, the selected driving limit in step 611 is for side limit data corresponding to the point "a2".

In step 612, the microcomputer of the computing circuit 28 receives an output signal of the focusing lens position detecting element 8 corresponding to the encoder 26, and judges whether the current position of the focusing lens component 20 is outside the range defined by set driving limits in step 609 and step 611. In case the current position is outside the driving limit, step 613 is selected, and in case the current position is inside the driving limit, step 614 is selected.

Step 613 supplies "0" as a moving speed data to the moving element 3 for making the focusing lens component 20 stop, and selects the step 601.

Step 614 receives an output signal of the contrast signal detecting element 9, and judges whether the increased value of the contrast signal is larger than a predetermined value or not, and thereby selects step 615 when the increased value is larger than the predetermined value, or alternatively selects step 616 when the increased value is smaller than the predetermined value.

Step 615 is a step for supplying data of faster driving speed than the speed of set driving speed data of step 606, to the driving element 3. This is for compensating the afore-mentioned troubles by the fact that each set of control regions has a certain width, and the like.

Step 616 is a step for supplying the set conditions in the above-mentioned steps from 606 to 611, or step 615, to the driving element 3. Accordingly, the driving element 3 operates based on the driving speed data set in step 606 or the faster driving speed data set in step 615 and the direction of the zooming action judged in step 607. The motor 23 is driven by the motor control circuit 29, and the focusing lens component 20 begins to move. After that, step 601 is selected and the above-mentioned steps are repeated. The driving element 3 which practices step 616 continues operation based on previous data, until new data are given.

Step 617, which is selected when the zooming action is not selected in the step 601, is a step for judging whether the zooming action was practiced beforehand or not, and also confirms whether the content of memory FZ in step 602 is "1" or not. When the content of momory FZ is "1", namely in case that the continued zooming action was already completed, step 618 is selected. When the content is "0", step 620 is selected. Step 618 is a step for resetting the content of the momory FZ to "0", and then it selects step 619.

Step 619 is a step for driving the automatic focusing element 10 only once, by detecting the contrast signal. In such operation, error at the finishing point of the zooming action, namely the error between U and U' in FIG. 2, is corrected. Such steps 617 and 619 are regarded as correcting means always to be practiced when the zooming action is finished. After finishing step 619, step 601 is selected for preparing the next zooming action.

Lastly, elucidation is made on step 620, which is to be selected when the judged result in the step 605 is in the regions (S1–S9) which can be controlled by the conventional control system, and when the content of memory FZ is "0".

Figure 6:
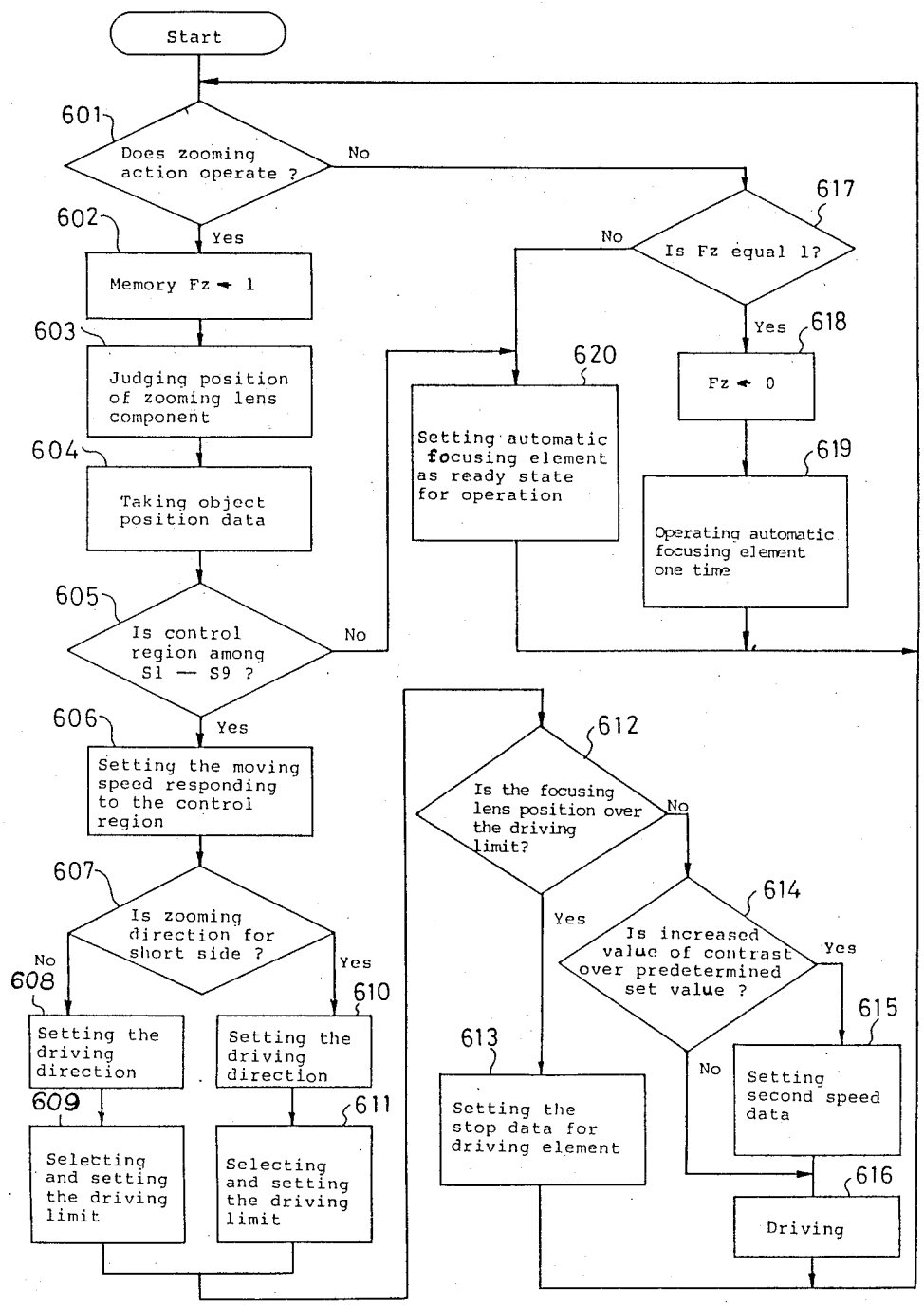
FIG. 6 is a flow-chart showing zooming actions of the zooming apparatus shown in FIG. 5.

Steps 620 is a step for driving the automatic focusing element 10 in normal operation by detection of the contrast signal, namely, for driving the element 10 when the contrast changes or when the output signal of the object position detecting element 2 changes. When step 620 is completed, step 601 is selected as shown in FIG. 6.

As mentioned above, in case the computing circuit 28 is constituted by a microcomputer system, the operation of steps 601 to 619 are repeated during the zooming action until the zooming action is completed, and after finishing such operation, a normal control system for controlling the focusing lens component is set in step 620.

According to the present invention, the object position detecting element 2 as the distance measuring apparatus 24 need not have a high precision and can output signals corresponding to divided plural regions from the closest position to the infinity, because the zooming control is practiced for standardizing the plural control regions (S1–S16) as mentioned above. Accordingly, several distance detecting apparatuses, such as a PSD (Position Sensing Device), photo-diodes for projection and receiving the light or supersonic generators can be used because all these apparatuses can output distance data.

In the above-mentioned operations, the computing circuit 28 practices the zooming control method in accordance with the present invention shown in FIG. 4. The zooming apparatus in accordance with the present invention shown in FIG. 5 practices the movement of the focusing lens component in response to the movement of the zooming lens component using the focusing characteristics during the zooming action.

What is claimed is:

1. A zoom lens control system comprising:
   zooming lens position detecting means for detecting current position of a zooming lens component of a zoom lens,
   object position detecting means for measuring distance from focal plane of said zoom lens to an object,
   control region memory means for memorizing data of plural control regions allotted to plural divided focal length regions from longest focal length to shortest focal length of said zoom lens, and plural divided object position regions from closest focusing position of said zoom lens to infinity,
   control region selecting means for selecting most suitable one control region among said plural control regions based on current focal length and current object position,
   driving speed data memory means for memorizing data of plural driving speeds corresponding to said plural control regions, for driving a focusing lens component of said zoom lens,
   driving means for driving said focusing lens component for adjusting position of said focusing lens component to maintain focused state of said object on said focal plane of said zoom lens, and
   driving speed data reading means for reading out one driving speed data corresponding to said selected control region and supplying driving signal to said driving means for driving said focusing lens component in most suitable speed based on said current focal length and said current object position.

2. A zoom lens control system in accordance with claim 1, wherein
   said zoom lens comprises p1 a first group of afocal lens components which face the object and fix an open aperture value and longest focal length of said zoom lens,
   a second group of zooming lens components for varying the focal length of said zoom lens,
   a third group of compensating lens components for compensating abberations with the zooming action,
   a fourth group of relay lens components for leading light beams from an object to focal plane of said zoom lens, and
   a fifth group of focusing lens components for focusing the image of said object on said focal plane.

3. A zoom lens control system comprising:
   automatic focusing means for adjusting position of a focusing lens component of said zoom lens to maintain a focused image of an object on focal plane of said zoom lens,
   zooming lens position detecting means for detecting current position of a zooming lens component,
   focusing lens position detecting means for detecting current position of said focusing lens component,
   object position measuring means for measuring distance from said focal plane of said zoom lens to said object,
   zooming direction detecting means for detecting whether said zooming action is from shorter side to longer side of focal length or the contrary,
   control region memory means for storing data of plural control regions allotted to plural divided focal length regions from longest focal length to shortest focal length of said zoom lens, and plural divided object position regions from closest focusing position of said zoom lens to infinity,
   driving speed data memory means for memorizing plural driving speed data, corresponding to said plural control regions, for driving said focusing lens component,
   control region selecting means for selecting one control region among said plural control regions based on current focal length and current object position, for judging whether said selected control region is in first group of control regions in which said focusing lens component is driven in a constant speed or in second group of control regions in which said focusing lens component is driven in a speed corresponding to said selected control region, and for setting said automatic fousing means in ready state, driving means for driving said focusing lens component in said constant speed when said selected control region is in said first group, in said speed corresponding to selected control region when said adjusting position of said focusing lens component to maintain focused state of said object on said focal plane of said zoom lens taking account of zooming direction and driving speed, and driving speed data reading means for reading out said constant speed data when said selected control region is in said first group, and one driving speed data corresponding to said selected control region when said selected control region is in said second group, and supplying driving signal to said driving means for driving said focusing lens component in most suitable speed based on said current focal length and said current object position.

4. A zoom lens control system in accordance with claim 3, wherein said automatic focusing means is operated only once when zooming action is completed.

5. A zoom lens control system comprising:

contrast signal measuring means for measuring contrast signals of an object passing through a zoom lens, zooming lens position detecting means for detecting current position of a zooming lens component of said zoom lens, focusing lens position detecting means for detecting current position of a focusing lens component of said zoom lens, object position measuring means for measuring distance from focal plane of said zoom lens to said object, zooming direction detecting means for detecting whether said zooming action is from shorter side to longer side of focal length or the contrary, control region memory means for memorizing data of plural control regions allotted to plural divided focal length regions from longest focal length to shortest focal length of said zoom lens, and plural object position regions from closest focusing position of said zoom lens to infinity, control region selecting means for selecting most suitable one control region among said plural control regions based on current focal length and current object position, driving speed data memory means for memorizing first plural driving speed data an second plural driving speed data which are faster than said first plural driving speed data respectively corresponding to said plural control regions for driving said focusing lens component of said zoom lens, driving limit setting means for setting driving limit data of said focusing lens component corresponding to said control regions, driving limit data memory means for memorizing said driving limit data, driving limit judging means for judging whether position of said focusing lens component is ouside a range defined by said driving limit setting means or not, contrast characteristic judging means for judging whether increased contrast value is larger than a predetermined set value or not, driving means for driving said focusing lens component for adjusting position of said focusing lens component to maintain focused state of said object on said focal plane of said zoom lens based on zooming direction and driving speed of said focusing lens component, and driving speed data reading means for reading out and outputting driving speed data which is said first driving speed data when said increased contrast value is smaller than said set value, which is said second driving speed data when said increased contrast value is larger than said set value, and which is stop signal for making said focusing lens component stop when position of said focusing lens component is outside said range defined by said driving limit setting means.

6. A zoom lens control system in accordance with claim 5, wherein said focusing lens component is adjusted once by basing on output signal of said contrast measuring means when said zooming action is completed.

7. A zoom lens control system in accordance with claim 5 or 6, wherein said contrast measuring means serves as an automatic focusing apparatus.

8. Zooming control method having steps of:

zooming lens position detecting step for detecting current position of a zooming lens component of a zoom lens, object position measuring step for measuring distance from focal plane of said zoom lens to an object, control region memory step for memorizing plural control regions allotted to plural divided focal length regions from longest focal length to shortest focal length of said zoom lens, and plural divided object position regions from closest focusing position of said zoom lens to infinity, control region selecting step for selecting most suitable one control region among said plural control regions based on current focal length and current object position, driving speed data memory step for memorizing data of plural driving speeds corresponding to said plural control regions, for driving a focusing lens component of said zoom lens, driving step for driving said focusing lens component for adjusting position of said focusing lens component to maintain focused state of said object on said focal plane of said zoom lens, and driving speed data reading step for reading out one driving speed data corresponding to said selected control region and supplying driving signal to said driving step for driving said focusing lens component in most suitable speed based on said current focal length and current object position.

9. Zooming control method having steps of;

automatic focusing step for adjusting position of a focusing lens component of a zoom lens to maintain focused image of an object on focal plane of said zoom lens, zooming lens position detecting step for detecting current position of a zooming lens component of said zoom lens, focusing lens position detecting step for detecting current position of said focusing lens component, object position measuring step for measuring distance from said focal plane to said object, zooming direction detecting step for detecting whether said zooming action is from shorter side to longer side of focal length or the contrary, control region memory step for memorizing data of plural control regions allotted to plural divided focal length regions from longest focal length to shortest focal length of said zoom lens, and plural divided object position regions from closest focusing position of said zoom lens to infinity, driving speed data memory step for memorizing plural driving speed data corresponding to said plural control regions for driving focusing lens component of said zoom lens, control region selecting step for selecting one control region among said plural control regions based on current focal length and current object position, for judging whether said selected control region is in first group of control regions in which said focusing lens component is driven in a constant speed or in second group of control regions in which said focusing lens component is driven in a speed corresponding to said selected control region, and for setting said automatic focusing step in ready state, driving step for driving said focusing lens component in said constant speed when said selected control region is in said first group, in said speed corresponding to said selected control region when said selected control region is in said second group, for adjusting position of said focusing lens component to maintain focused state of said object on said focal plane of said zoom lens based on zooming directions and driving speed, and driving speed data reading step for reading out constant speed data when said selected control region is in said first group, and one driving speed data corresponding to said selected control region when said selected control region is in said second group, and supplying driving signal to driving means for driving said focusing lens component in most suitable speed based on said current focal length and said current object position.

10. Zooming control method in accordance with claim 9, wherein said automatic focusing step is operated only once when zooming action is completed.

11. Zooming control method having steps of:

contrast signal measuring step for measuring contrast signals of object passing through a zoom lens, zooming lens position detecting step for detecting current position of a zooming lens component of said zoom lens, focusing lens position detecting step for detecting current position of said focusing lens component, object position measuring step for measuring distance from said focal plane to said object, zooming direction detecting step for detecting whether said zooming action is from shorter side to longer side of focal length or the contrary, control region memory step for memorizing plural control regions allotted to plural divided focal length regions from longest focal length ot shortest focal length of said zoom lens, and plural divided object position regions from closest focusing position of said zoom lens to infinity, control region selecting step for selecting most suitable one control region among said plural control regions based on currentg focal length and currentg object position, driving speed data memory step for memorizing first plural driving speed data and second plural driving speed data which is faster than said first plural driving speed data respectively corresponding to said plural control regions for driving focusing lens component of said zoom lens, driving limit setting step for setting driving limit data of said focusing lens component corresponding to said control regions, driving limit data memory step for memorizing said driving limit data, driving limit judging step for judging whether position of said focusing lens component is outside a range defined by said driving limit setting step or not, contrast characteristic judging step for judging whether increased contrast value is larger than a predetermined set value or not, driving step for driving said focusing lens component for adjusting position of said focusing lens component to maintain focused state of said object on said focal plane of said zoom lens based on zooming direction and driving speed, and driving speed data reading step for reading out and outputting driving speed data which is said first driving speed data when said increased contrast value is smaller than said set value, which is said second driving speed data when said increased contrast value is larger than said set value, and which is stop signal for making said focusing lens component stop when position of said focusing lens component is outside said range defined by said driving limit setting step.

12. Zooming control method in accordance with claim 11, wherein said focusing lens component is adjusted by being based on the output signal of said contrast measuring step.

13. Zooming control method in accordance with claim 11 or 12, wherein said contrast measuring step is practiced by an automatic focusing apparatus.

* * * * *